United States Patent [19]

Laier

[11] Patent Number: 4,812,831
[45] Date of Patent: Mar. 14, 1989

[54] KEY SWITCH WITH CONTROLLABLE ILLUMINATION

[75] Inventor: Carl P. Laier, Reading, Mass.

[73] Assignee: AMP Incorporated, Harrisburg, Pa.

[21] Appl. No.: 12,971

[22] Filed: Feb. 10, 1987

[51] Int. Cl.$^4$ .............................................. H01H 9/16
[52] U.S. Cl. ........................ 340/711; 200/314; 200/312; 341/23; 341/31
[58] Field of Search ............ 340/712, 716, 711, 365 P, 340/365 VL, 365 R; 200/5 A, 317, 314, 313, 312, 221; 250/338, 340; 364/707

[56] References Cited

U.S. PATENT DOCUMENTS

| 3,673,327 | 6/1972 | Johnson et al. | 178/18 |
|---|---|---|---|
| 3,727,069 | 4/1973 | Crittenden, Jr. et al. | 250/222 R |
| 3,851,328 | 11/1974 | Sottile et al. | 340/365 P |
| 3,955,185 | 5/1976 | Nishimura | 364/707 |
| 4,198,623 | 4/1980 | Misek et al. | 340/365 P |
| 4,267,443 | 5/1981 | Carroll et al. | 250/221 |
| 4,271,404 | 6/1981 | Tanaka | 340/365 R |
| 4,384,201 | 5/1983 | Carroll et al. | 250/221 |
| 4,449,024 | 5/1984 | Stacenei | 200/317 |
| 4,532,395 | 7/1985 | Zukowski | 200/314 |
| 4,551,598 | 11/1985 | Hamilton et al. | 200/314 |
| 4,672,364 | 6/1987 | Lucas | 340/365 P |
| 4,683,360 | 7/1987 | Maser | 200/5 A |

Primary Examiner—Donald J. Yusko
Assistant Examiner—Alvin Oberley
Attorney, Agent, or Firm—Katherine A. Nelson

[57] ABSTRACT

An illuminated membrane keyboard 18 includes a light beam matrix, which when broken by the shadow of a stylus, operates logic to turn on illumination for a preset time rendering a normally dead front appearing keyboard visible. This feature conserves energy required to power illumination, lengthens the life of the illuminating source and limits access to the keyboard.

10 Claims, 3 Drawing Sheets

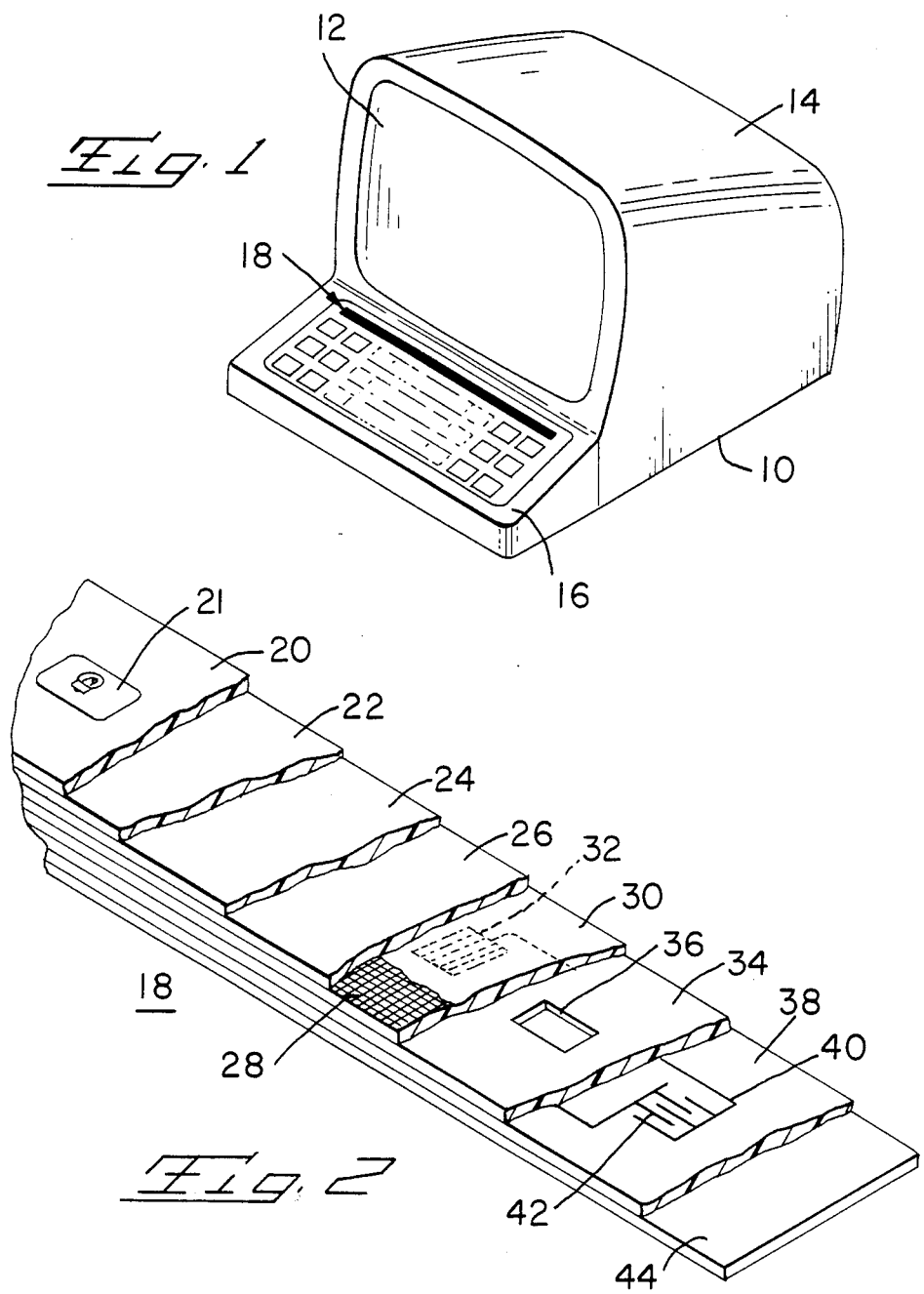

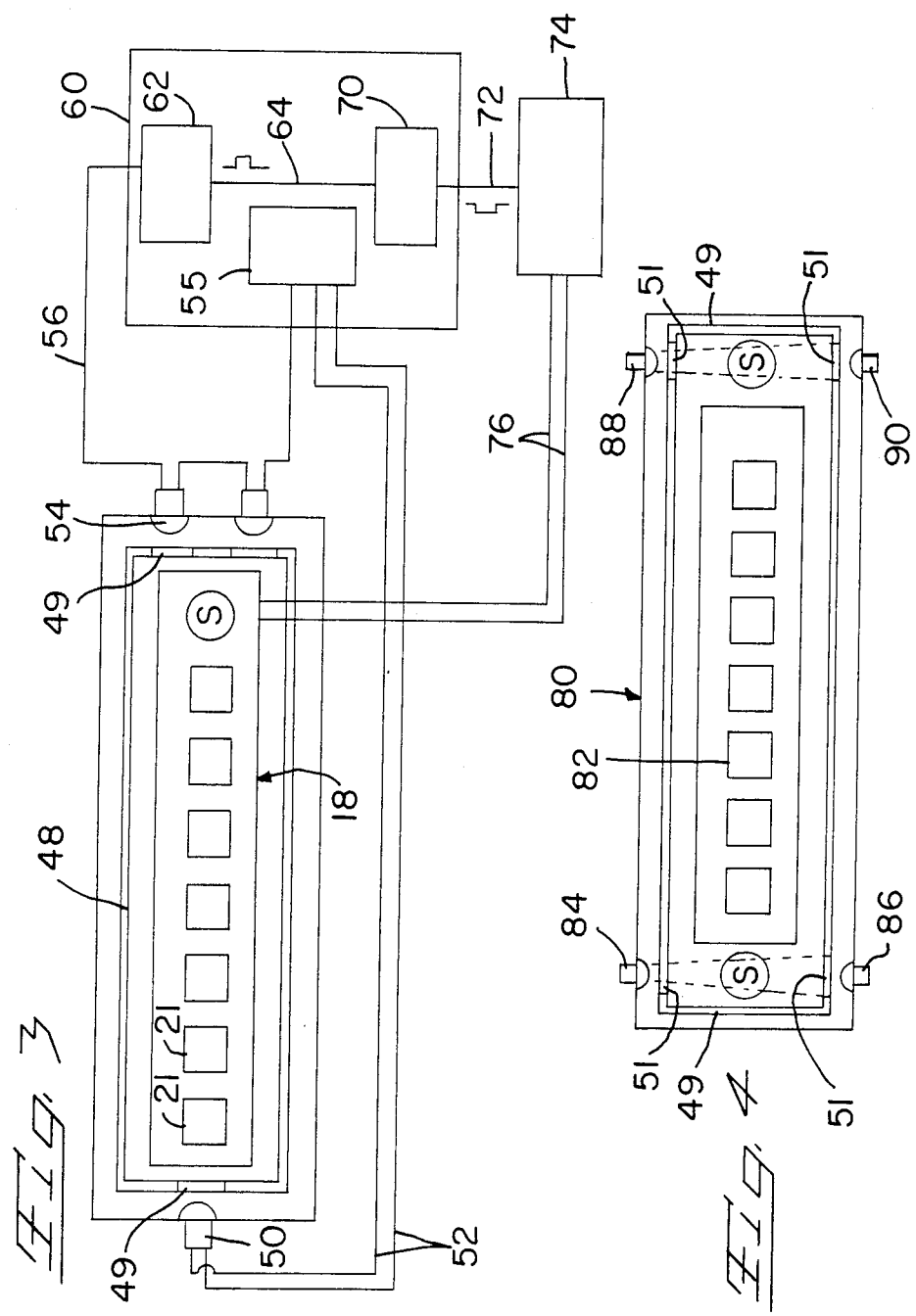

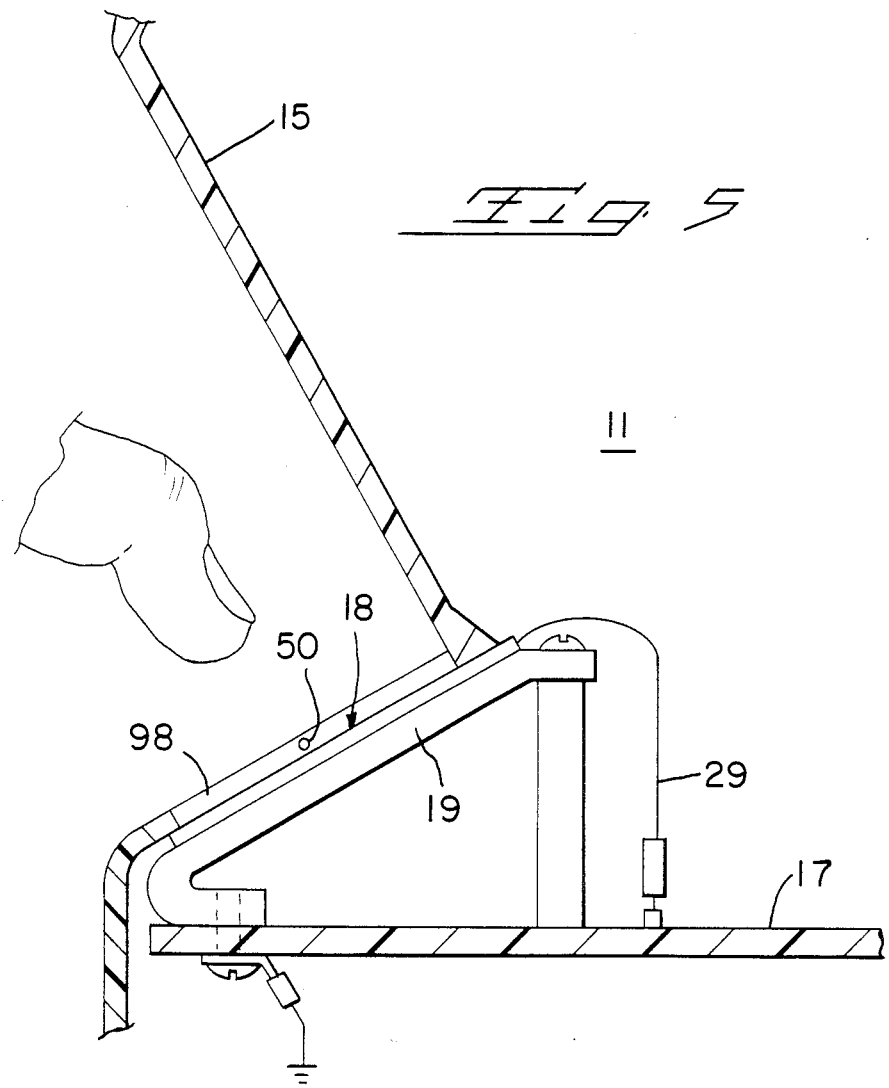

KEY SWITCH WITH CONTROLLABLE ILLUMINATION

This invention relates to the field of keyboards of the back lighted membrane type.

BACKGROUND OF THE INVENTION

The use of the illumination in keyboards of the membrane or lamina type is well known, particularly where the graphic layer, usually the top layer of a membrane switch is rendered to provide a dead front or blank appearance. The provision of a dead front or unidirectional mask for a membrane keyboard switch is generally accomplished by the choice of dark or black inks utilized in the printing of the graphic portions of the switch. This is typically done for esthetic reasons in order to provide a contrast between a given switch point or the colors chosen for the graphics. Dead front coverage may be utilized over the entire switch face or selectively in portions of the switch. When this is done, it is necessary to illuminate the graphics from the rear which is termed "back lighting" and is accomplished by making the membrane switch construction relatively transparent except for the dead front top layer which contains the graphics.

A variety of sources of illumination for back lighting have been employed. Included are incandescent bulbs which have the advantage of relatively low cost but the disadvantages of heat generation and relatively high energy consumption and a certain fragility caused by the need for a fine filament typical of incandescent bulbs. Also, fluorescent light sources have been employed with less of a consumption of energy but also having a certain fragility and a relatively higher cost. A third type of illumination now beginning to be used relative to display panels employs the phenomena of electroluminescence which shall be here termed EL. From an initial shortcoming of relatively high cost and limitations in regard to colors available, the EL concept has been extended first from displays made of glass to light sources, wherein the electroluminescing powders can be printed on the substrates such as polyester film by silk screening techniques. This capability opens the door to a wider use of EL as a light source and particularly where its use can be employed in a thin lamina structure such as a membrane keyboard. One of the problems with the employment of EL as a source of illumination is the fact that the effective life of the EL device is fairly limited, particularly wherein the electroluminescing powders must be driven hard in order to provide sufficient light for contrast purposes. In certain instances of commercial use of EL devices, the effective life has been on the order of 1200 hours or perhaps slightly more, which is considerably less than the effective life of the component or system which is served thereby.

In addition to limited life for EL devices, there is a considerably greater use of energy than with front lighting by incandescent bulbs.

A third aspect of the background of the invention relates to the fact that the desirability to limit access to the controls of electronic devices such as computer terminals, T.V. sets, control monitors, and the like. For example, it would be desirable if the horizontal, vertical and contrast controls of a television set might be sufficiently concealed or made "invisible" as to allow only an authorized person to adjust the picture on such receiver. The same holds for computer and telecommunication monitors and more particularly, to such CRT displays as are now used in aircraft and on industrial controls. Presently, most of these controls are visible either on the front of the display of the device or are located in an obvious position on the rear thereof and may be easily manipulated or tampered with or indeed, accidentally moved to the end dissatisfaction of the user.

SUMMARY OF THE INVENTION

This invention relates to an illuminated membrane keyboard or key switch wherein the illumination is controlled by a light beam arrangement with both the light beam and the keyboard nominally hidden from view. This is accomplished by providing the illumination beneath the membrane to back light such, with the upper or graphic layer of the keyboard being opaque without such back lighting. The light beam is provided in a preferred embodiment through the use of an infrared LED operating at a frequency above that which the human eye can detect in conjunction with appropriate phototransistors or photodiodes arranged to sense the presence or absence of such light beam energy. The LED and photodiodes are mounted in a bezel which is opaque to visible light but will transmit light in the infrared range. A circuit is provided which is responsive to the breaking of a light beam as by a finger or stylus touching the keyboard in a selective position to turn on the illumination and backlight the keyboard so that it may be utilized. A time is provided to automatically cut off the illumination following a predetermined and preselected period of time to both obscure the keyboard from sight and to save energy, extend the life of the source of illumination and provide the "invisible" feature. In a preferred embodiment, the source of the illumination utilized is an EL layer positioned within the lamina membrane keyboard. It is contemplated that the arrangement of the invention may be employed in a wide variety of uses in conjunction with keyboards of normal construction utilized for computers, telecommunication, data processing, industrial controls, and placed in a front position or alternatively, placed to the rear of similar devices including television sets, allowing only competent technicians to adjust such through the special knowledge of the hidden arrangement.

BRIEF DESCRIPTION OF THE DRAWINGS

FIG. 1 is a perspective of a data terminal including a keyboard and additionally including the auxiliary keyboard of the present invention adjacent the normal keyboard position;

FIG. 2 is an enlarged schematic view in perspective and partial section showing the various laminations of the keyboard in accordance with the present invention;

FIG. 3 is a schematic view of the keyboard of the present invention in conjunction with preferred circuit arrangement therefore;

FIG. 4 is a view similar to FIG. 3 but with an alternative arrangement for the light beam feature; and FIG. 5 is a sectional view of a portion of the rear of an electronic apparatus such as a television set showing in partial section an arrangement for mounting the keyboard of the present invention.

DETAILED DESCRIPTION OF THE INVENTION

Referring now to FIG. 1, there is shown a data terminal labeled 10 including a display 12 mounted in a terminal housing 14. Affixed to 14 is a keyboard 16 which may be either integral therewith or as shown separate therefrom. Positioned above the normal keyboard face is the keyboard of the invention which is in a sense an auxiliary keyboard and while shown mounted above the normal keyboard in this preferred embodiment, could be mounted to the right, left, rear or in any convenient position on the keyboard housing. It is to be understood that the keyboard 18 is normally made to contain a limited number of functions such as six or ten or twelve, and is to be used for controlling the various modes or functions of display or other attributes of the terminal 10 which it serves. Thus it may be used for controlling different programming formats and different modes of transmission or reception or it may be used additionally for controlling contrast or shading or light intensity of the display of the terminal 10 and as will be hereinafter described, it may be utilized to in fact access the terminal or some aspect of the terminal.

In accordance with the invention, the keyboard 18 is made to have a dead front or opaque appearance as indicated in FIG. 1 in order for it to remain hidden, except when backlighted by a controlled illumination. The use of a dead front keyboards in membrane keyboard technology is well known and is employed in whole or in part in a wide variety of keyboards in use today. The technique is accomplished by the selection of inks applied during the processing of the top layer of the keyboard as one of a series of the finite steps employed in such printing to achieve preferred colors and geometry of the key symbols. The provision of an opaque appearance may be accomplished by depositing the inks either on the top surface of the top layer or preferably on the undersurface of the top layer as the first step of the series of printing steps to follow. In this way, the symbols employed in conjunction with the keyboard are invisible unless light is made to shine through from the rear of the keyboard structure. The use of dead fronting is typically arranged in a flat black or a flat brown color and may be done in a manner so that virtually no key location can be observed without backlighting.

Referring now to FIG. 2, there is shown an enlarged and sectioned but not scaled view of the keyboard 18 which includes a series of laminations or layers each having its particular function. In accordance with the invention, the top layer 20 is the graphic layer which is typically made of a polyester film on the order of 0.005 to 0.007 inches in thickness. Key locations are shown as elements 21. In the preferred embodiment, the graphic ink for such is provided on the undersurface of 20 to protect it from use. Next is provided a layer of adhesive 22 and thereafter a layer 24 which is the EL lamp assembly and is comprised of suitably selected phosphorescing inks or powders embedded in a matrix of adhesive and bonded to a polyester film on the order of 0.005 inches in thickness, with suitable electrodes applied to the rear surface thereof to produce an electric field which excites the powders of the EL assembly and causes the illumination phenomena to occur. Referring further to FIG. 2, there is a coating of adhesive shown as 26 beneath the EL lamp assembly.

In accordance with FIG. 2 and the illustrative embodiment included therein, there is beneath the adhesive layer 26 a grid 28 which is made of conductive ink and may be utilized for an ESD (electro static discharge) shield which may be optionally employed to isolate the circuit path beneath the EL lamp assembly from the field employed to excite such. The ESD shield is laid down on the top surface of a plastic layer shown as 30 with a selective deposit of conductive material in the form of circuits 32 printed onto the bottom of 30. The circuits 32 form part of the switch function for keyboard 18.

Next is shown a layer 34 which may be alternatively a thin layer of polyester having a series of apertures or holes 36 therein which register with circuit traces 32 to define contact points and isolate the remaining parts of circuit traces in the switch, or can be dots of insulation silk screened on to a film to form a standoff. The next layer shown as 38 is made to contain the bottom circuit portion of the switch which is formed of polyester film and made to contain circuit traces which, when made to contact circuit 32 through holes 36, achieve a particular contact function. These circuits are shown as 40 and 42 and in the optional arrangement shown, form both sides of the circuit of the switch with the circuits 32 bridging the different paths 42 to effect switch closure. The final layer shown as 44 in FIG. 2 represents an adhesive layer applied to the bottom of the layer 38.

In all of this, it is important that the lamina package shown to include many layers be relatively thin and flexible so that pressure applied by finger or stylus upon a switch point location shown on the top layer as S, as in FIG. 3 will cause the switch points to be closed, the circuits 32 being pressed through the apertures 36 to contact the circuits 40 and 42. As a further point, it is preferable in the case of the present invention to utilize adhesives that are flexible during the life of use and that are maintained relatively thin as on the order of 0.001 inches in order to maintain the desired flexibility and thinness of the keyboard 18.

While the keyboard 18 has been shown in the form of a strip, which is relatively long compared to its width, it can of course be rendered in a variety of different geometries including square or round, or indeed in any other desired configuration as long as it is maintained in a relatively planar state so as to function properly. With the keyboard 18 thus assembled, it may be applied to any flat substrate including a flat portion of the keyboard 16 to have an unilluminated appearance of an area of black or brown or suitable color chosen to fit in esthetically with the keyboard 16.

Alternatively, the keyboard 18 may be placed elsewhere including to the rear of a data terminal or a television receiver as will be detailed relative to FIG. 5 hereinafter. Suffice to say, in operation the keyboard 18 will when nonilluminated, appear as a blank strip with the graphic key locations in essence invisible. When the EL lamp is excited, the back lighting effect will occur and the graphic symbols representing the key locations will show up to allow use. A depression by a finger or stylus of the top layer proximate to the key switch graphic representation will result in closure of the circuit shown as 32 with the circuits 40 and 42 to effect a switch closure. Removal of the stylus will result in an opening of these circuits by virtue of the characteristics of the polyester films 30 and 38 as held apart by the spacer structure in film 34, all as is standard in membrane switch functioning.

In summary, when the EL lamp is off, the switch will be invisible and when it is on, the various graphic key switch locations will be illuminated and ready for use.

Referring now to FIG. 3, a further and related aspect of the invention is shown wherein the keyboard 18 is mounted within a frame shown as 48 which is preferably set into the frame of keyboard 16 to become part of the facade of such keyboard. The frame 48 includes a series of apertures 49 as shown in FIG. 3 which may be either open or covered with a plastic suitably tinted to blend in with the frame 48 but made to be infrared transparent and visible light opaque. Beneath the upper surface of frame 48 and hidden from view and is shown in FIG. 3, there is provided an infrared transmitter shown as 50 appropriately powered by leads 52 and, to the opposite side of the frame, a pair of receivers which may be phototransistors or photodiodes shown as 54 appropriately powered by leads such as 56. In operation, energization of infrared LED 50 causes light to be broadcasted over the surface of keyboard 18 to be received by the receivers 54 which in turn detect such light and develop a signal indicating a received condition. Reference is made to U.S. Pat. Nos. 4,267,443 and 4,384,201 to Arthur B. Carroll, et al., for a teaching of the practice of utilizing infrared, transmitter and receiver devices to effect a switch function and to U.S. Pat. No. 3,764,813 to Clement, et al., which teaches, broadcasting a light beam over the surface of displays. In such references, there is taught not only the appropriate devices to be employed but circuits which allow the devices to be properly pulsed and the signals appropriately utilized for effecting a switch function. As these devices, 50 and 54, work in the range of light related to the 800 to 900 nanometer frequency, the light is in essence invisible to the human eye. In accordance with the teaching with the heretofore patents, the insertion of a stylus shown as S which is typically the finger of an operator, casts a shadow which in essence breaks the beam and causes a reduction in the received energy to the elements 54 which then, sensing such absence of light or reduction of light level, reduce their output to provide a signal of the breaking of the light beam.

In accordance with the invention, there is provided a circuit shown as 60 which may be thought of as a circuit card or electronic package appropriately mounted in the electronic assembly which is served by the keyboard. Leads 52 and 56 are connected to board 60 and an appropriate driver circuit thereon shown as element 55. Board 60 further includes a logic circuit 62 in the form of a flip-flop or bi-stable device which as an on or off condition responsive to the signal level provided from the receiver elements 54 via leads 56. The output of element 62 is connected via lead 64 to a timer shown as 70 in FIG. 3 which operates to produce an output via lead 72 to an EL power supply shown as 74 which in turn supplies power to the EL source of illumination via leads 76. The timer 70 is made to provide an output holding power supply 74 on for a preselected and predetermined period of time ranging from a number of seconds to a number of minutes responsive to each pulse input from element 62. In accordance with the invention, operation is as follows. Assuming that there is no stylus in the field of the light being generated by element 50 and received by element 54, the EL lamp will be off and the keyboard 18 will appear blank. Upon the insertion of the stylus interrupting the light beam, a change in sensed energy will be detected by elements 54 providing a voltage change via leads 60 as an input to the logic unit 62. Element 62 will then provide a pulse output via lead 64 to timer 70 turning the timer on which will produce an output via lead 72 to cut on power supply 74, in turn powering up the EL device via leads 76. The key locations 21 will then be illuminated by the EL device along the length of keyboard 18 to allow selection and actuation of an appropriate key or keys. In accordance with the invention, each insertion of a stylus or finger into the light beam field will result in a further output from logic unit 62, resetting the timer 70 to continue to hold the power supply 74 in an on condition and maintain the keyboard illuminated. In accordance with the functioning of this unit, removal of the stylus and the accompanying voltage change that results thereby is preferably blocked as an input to 62 by appropriate circuitry to prevent a change of state and thus resetting of timer 70. Repeated insertion of the stylus in the light beam field will keep the illumination on and a cessation of interruption of the beam will result in the timer 70 in the preset period of time, de-energizing 74 and causing the EL illumination to cease.

In brief summary then, the keyboard in a normal condition will be off and opaque or dead front in appearance. The insertion of a finger or stylus into the beam field in accordance with the embodiment of FIG. 3, anywhere in the general key area will interrupt the light beam, resulting in the timer being actuated to turn on the illumination for a prefixed period of time. Thereafter, repeated insertion of the stylus into the beam field will maintain the illumination in an on condition until a certain period of time after the last insertion of the stylus. To the casual user or to the uninitiated or unapprised user, the key switch will be effectively hidden. To one knowledgeable and authorized to utilize the key switch, an insertion of the finger anywhere in the key field will result in an illumination allowing use and manipulation of the key switch to result in whatever function or functions are desired in conjunction with a given piece of electronic gear. In this regard a particular sequence of insertions of a stylus may be made to initiate first illumination with single uses from thereafter keeping the illumination on - a coding. To do this reference may be made to the Clement, et al., patent for a related teaching.

FIG. 4 shows an alternative version of the keyboard heretofore described shown as a keyboard 80. Keyboard 80 includes a series of key points 82 with the keyboard being surrounded by the bezel 49 having apertures 51 which may be optionally covered with an infrared transparent plastic material serving as windows to photo devices. These devices are shown in FIG. 4 as transmitters 84 and 88, arranged at different ends of the keyboard producing beams of light detected by receivers 86 and 90. In accordance with the embodiment of FIG. 4, there would be required the use of two styluses shown as S or two fingers in order to break both light beams in order to energize the power supply and cause the keyboard to be illuminated. This can be accomplished by placing the receivers 86 and 90 in essentially the same circuit as heretofore detailed, but in series in a manner so that both output levels must be reduced to provide a signal sufficient to switch the logic unit 62. Practically speaking, the version of the invention shown in FIG. 4 requires two fingers, two hands simultaneously inserted in the particular fields defined by the two light beams at each end of the keyboard, an arrangement much less likely of accidental discovery.

FIG. 5 shows such an application wherein the switch 18 is mounted at the rear of a television chassis 11 in the frame 15. An internal circuit board 17 is used to support a plate 19 to which switch 18 is secured. Element 29 represents a grounded lead connected to a ground circuit on board 17. Element 98 represents the plastic frame covering the infrared transmitter 50 shown in FIG. 5. All adjustments for the display part of the set may be accommodated via 18, and an appropriate switch connection to the television set circuit.

In a unit utilizing the circuit shown in FIG. 3, the LED element 50 and the receivers 54 were commercially available units as was the driver 55. The logic unit 62 a single low power relay and the timer was a standard 5-5-5 timer. The EL lamp and its power supply 74 were sourced from commercially available sources. This unit used a power supply of 120 voltage, 725 Hertz frequency, requiring 2.4 milliamperes in current.

In accordance with calculations, the duty cycle of the EL device could be reduced to less than one percent in certain applications such as in relation to the controls of a television receiver and only a few percent in relation to use with a computer or data terminal wherein the switch is used for mode control, programming functions, and/or display function control. This reduction in duty cycle would extend the life of the EL device, effectively many thousands of hours and well beyond the normal mean time to failure of the electronic apparatus served thereby. Additionally, the power requirements which would be related to the expected duty cycle would be drastically reduced to the advantage of portable devices using the invention, circuit, and apparatus.

In an actual embodiment of the invention keyboard, the keyboard could have dimension of one inch by twelve inches and a thickness of less than fifty thousandths of an inch.

In the foregoing description, the keyboard of the invention has been shown in conjunction with an attachment to or close proximity with, the electronic gear served thereby. It is contemplated that the invention keyboard may be utilized remote from such electronic gear to effect all the advantages heretofore ascribed thereto.

Having disclosed and described the invention intending to enable its practice in the preferred mode, I now set forth the claims which are intended to define the bounds of the invention.

I claim:

1. A keyboard switch of the membrane type comprising:
   a series of layers suitably spaced apart and having conductive traces thereon to form switch points;
   a graphics layer extended thereover including a series of graphic symbols representing switch point functions, each registered with a given switch point, said graphics layer including a layer which is opaque when viewed from above said keyboard;
   a source of illumination positioned beneath said graphic layer operable to cause said symbols to appear when energized;
   power supply means to control said source of illumination;
   logic means and a timer means operable to control said power supply means in a normally off condition to conserve the use of energy and extend the life of said source of illumination; and
   sensing means providing an infrared beam field broadcast over the surface of the keyboard, said sensing means being responsive to the insertion of a stylus into said beam field substantially anywhere in the general key area to interrupt the lightbeam field to activate said logic means and time means to turn said source of illumination on for a predetermined period of time.

2. The keyboard of claim 1 wherein said sensing means is comprised of light beam transmitter and receiver means positioned to essentially cover said graphics layer in a planar sense.

3. The keyboard of claim 2 wherein said sensing means is comprised of a light beam transmitter of the infrared type and the receiver means are comprised of infrared receiver means, whereby the presence of said light beam is invisible to human eye.

4. The keyboard of claim 3 where there is included a frame comprised of a plastic material opaque to visible light and transparent to infrared light and said source of illumination are positioned behind said frame relative to the keyboard.

5. The keyboard of claim 1 wherein said source of illumination is comprised of an electroluminescent panel.

6. The keyboard of claim 1 wherein the source of illumination is comprised of an electroluminescent panel formed on a plastic film.

7. A keyboard of the membrane type comprising:
   a first layer having a dead front appearance to ambient light;
   a series of key locations graphically defined in said first layer;
   second and third layers attached thereto including an illumination means and a key switch means with the key switch means having key locations registered with said graphic locations, said illumination means when energized causing said key graphic locations to become visible; sensing means located proximate said dead front layer including a source of infrared light and a light detector positioned to broadcast a beam field over the surface of said keyboard responsive to the insertion of a stylus into said beam field substantially anywhere in the general key area, thereby interrupting said field and activating a control signal; and
   further means responsive to said control signal to power said illumination means to an on condition from a normally off condition including timer means adapted to turn said power off following a preselected period of time; whereby
   the timer means causes the life of the illumination means to be extended by reducing the energy requirements when said illumination means is not in use and said keyboard is hidden from view.

8. An electronic assembly comprising:
   key switch adapted to provide inputs to an electronic circuit;
   a unidirectional opaque mask covering said key switch so that the switch is hidden from view;
   a source of illumination within said key switch operable to illuminate said switch to make it visible through said mask;
   a power supply for said source having a normally off condition;
   an infrared transmitter and receiver positioned to cover the surface of said key switch with an infrared light beam field;

means driving said transmitter and receiver and responsive thereto to provide an output signal when said beam field is broken by the insertion of a stylus into said beam field substantially anywhere in the general key switch area;

logic means responsive to said output signal; and timer means responsive to said logic means connected to said power supply to turn said supply on for a limited period and activate said source of illumination; whereby said key switch is made useful when and only when said infrared beam field is broken to provide said output signal, thus conserving the life of said source of illumination.

9. The assembly of claim 8 wherein said source of illumination is a planar structure buried within and part of said key switch.

10. A keyboard switch of the membrane type comprising:

a series of layers suitably spaced apart and having conductive traces thereon to form switch points;

a graphics layer extended thereover including a series of graphic symbols representing switch point functions, each registered with a given switch point, said graphics layer including a layer which is opaque when viewed from above said keyboard;

a source of illumination positioned beneath said graphics layer operable to cause said symbols to appear when energized;

power supply means to control said source of illumination;

logic means and a timer means operable to control said power supply means in a normally off condition to conserve the use of energy and extend the life of said source of illumination; and sensing means responsive to the insertion of a stylus proximate to said graphics layer to operate said logic means and time means to turn said source of illumination on for a predetermined period of time, said sensing means comprising two sets of a light beam transmitter and receiver means positioned to essentially cover said graphics layer in a planar sense, said sets being spaced apart at two points relative to the surface of said graphics layer, said sensing means requiring the insertion of a stylus at each point to preclude accidental energization of said sensing means.

* * * * *